US009072993B2

United States Patent
Inui et al.

(10) Patent No.: US 9,072,993 B2
(45) Date of Patent: Jul. 7, 2015

(54) FILTER MEDIUM EQUIPPED WITH POROUS FILM, METHOD OF MANUFACTURING SAME, FILTER PACK, AND FILTER UNIT

(75) Inventors: Kunihiko Inui, Settsu (JP); Yoshiyuki Shibuya, Yuki (JP); Shunji Kasai, Settsu (JP); Taku Yamanaka, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 138 days.

(21) Appl. No.: 13/703,860

(22) PCT Filed: Jun. 8, 2011

(86) PCT No.: PCT/JP2011/063152
§ 371 (c)(1),
(2), (4) Date: Dec. 12, 2012

(87) PCT Pub. No.: WO2011/158717
PCT Pub. Date: Dec. 22, 2011

(65) Prior Publication Data
US 2013/0097982 A1    Apr. 25, 2013

(30) Foreign Application Priority Data

Jun. 17, 2010  (JP) ................................. 2010-138679
Nov. 18, 2010  (JP) ................................. 2010-258004

(51) Int. Cl.
| | |
|---|---|
| *B01D 39/16* | (2006.01) |
| *B01D 46/54* | (2006.01) |
| *B01D 46/52* | (2006.01) |

(52) U.S. Cl.
CPC .......... *B01D 39/1692* (2013.01); *B01D 46/543* (2013.01); *B01D 2275/10* (2013.01);
(Continued)

(58) Field of Classification Search
CPC .. B01D 39/1692; B01D 46/54; B01D 46/543; B01D 2239/065; B01D 2239/0654; B01D 2239/1216; B01D 2239/1291
USPC ............................. 55/486, 487; 96/4, 11, 12
See application file for complete search history.

(56) References Cited

U.S. PATENT DOCUMENTS 5,176,958 A    1/1993  Shimizu et al.
6,030,428 A *  2/2000  Ishino et al. .................... 55/486
(Continued)

FOREIGN PATENT DOCUMENTS

| JP | 57-60081 A | 4/1982 |
| JP | 64-1711 A | 1/1989 |

(Continued)

OTHER PUBLICATIONS

International Preliminary Report of corresponding PCT Application No. PCT/JP2011/063152.
(Continued)

Primary Examiner — Robert Clemente
(74) Attorney, Agent, or Firm — Global IP Counselors

(57) ABSTRACT

A filter medium includes a porous film and a support material supporting the porous film. The porous film includes polytetrafluoroethylene, has an average pore diameter of at least 2.5 μm, and has a porosity of at least 95%. A pressure loss is less than 100 Pa when air is passed through the filter medium at a velocity of 5.3 cm/sec. A collection efficiency of NaCl particles is at least 95% when air including NaCl particles with a particle diameter of 0.3 μm is passed through the filter medium at a velocity of 5.3 cm/sec. A PF value is at least 30, where PF={−log [(100−collection efficiency (%))/100]/pressure loss (Pa)}×1000. A dust holding capacity of polyalphaolefin particles held in the filter medium is at least 15 g/m² when air including polyalphaolefin particles with a count median diameter of 0.25 μm is continuously passed through the filter medium at a velocity of 5.3 cm/sec and pressure loss reaches 300 Pa.

5 Claims, 4 Drawing Sheets

(52) U.S. Cl.
CPC ...... *B01D2239/1291* (2013.01); *B01D 46/521* (2013.01); *B01D 46/54* (2013.01); *B01D 2239/0654* (2013.01); *B01D 2239/1208* (2013.01); *B01D 2239/1216* (2013.01)

(56) References Cited

U.S. PATENT DOCUMENTS

| | | | |
|---|---|---|---|
| 6,149,702 A * | 11/2000 | Kawano et al. | 55/497 |
| 6,214,093 B1 * | 4/2001 | Nabata et al. | 96/11 |
| 6,261,979 B1 * | 7/2001 | Tanaka et al. | 442/370 |
| 6,302,934 B1 * | 10/2001 | Nabata et al. | 55/486 |
| 6,334,881 B1 * | 1/2002 | Giannetta et al. | 55/486 |
| 6,336,948 B1 * | 1/2002 | Inoue et al. | 55/486 |
| 6,416,562 B1 * | 7/2002 | Shibuya et al. | 55/486 |
| 6,682,576 B1 * | 1/2004 | Kiyotani et al. | 55/486 |
| 6,808,553 B2 * | 10/2004 | Kawano et al. | 95/287 |
| 7,387,700 B2 * | 6/2008 | Tanaka et al. | 156/308.2 |
| 7,837,756 B2 * | 11/2010 | Choi | 55/527 |
| 7,846,238 B2 | 12/2010 | Suzuki et al. | |
| 7,959,705 B2 * | 6/2011 | Choi | 55/527 |
| 2002/0170434 A1 * | 11/2002 | Kawano et al. | 96/11 |
| 2003/0005669 A1 * | 1/2003 | Maeoka et al. | 55/486 |
| 2003/0010210 A1 * | 1/2003 | Kawano et al. | 95/287 |
| 2003/0094102 A1 * | 5/2003 | Maeoka et al. | 96/226 |
| 2004/0168417 A1 * | 9/2004 | Tanaka et al. | 55/486 |
| 2008/0307971 A1 * | 12/2008 | Horie et al. | 95/287 |
| 2010/0269464 A1 * | 10/2010 | Mori et al. | 55/486 |

FOREIGN PATENT DOCUMENTS

| | | |
|---|---|---|
| JP | 2-43911 A | 2/1990 |
| JP | 11-114383 A | 4/1999 |
| JP | 11-240918 A | 9/1999 |
| JP | 2006-61830 A | 3/2006 |
| JP | 2007-260547 A | 10/2007 |

OTHER PUBLICATIONS

International Search Report of corresponding PCT Application No. PCT/JP2011/063152.

* cited by examiner

FILTER MEDIUM EQUIPPED WITH POROUS FILM, METHOD OF MANUFACTURING SAME, FILTER PACK, AND FILTER UNIT

CROSS-REFERENCE TO RELATED APPLICATIONS

This U.S. National stage application claims priority under 35 U.S.C. §119(a) to Japanese Patent Application Nos. 2010-138679, filed in Japan on Jun. 17, 2010, 2010-258004, filed in Japan on Nov. 18, 2010, the entire contents of which are hereby incorporated herein by reference.

TECHNICAL FIELD

The present invention relates to a filter medium equipped with a porous film, a method of manufacturing the same, a filter pack, and a filter unit.

BACKGROUND ART

Filters are classified into ultra-low penetration air (ULPA) filters, high-efficiency particulate air (HEPA) filters, and medium-efficiency particulate air filters according to the collection efficiency of particles having a predetermined particle diameter. These are used for different purposes depending on their efficiencies, and medium-efficiency particulate air filters are used to clean the air in homes, offices, and hospitals, for example.

Filter media in which glass fiber serves as the base material are generally used in medium-efficiency particulate air filters, but in the case of filter media in which glass fiber serves as the base material, there is the problem that, in order to satisfy the predetermined collection efficiency required of medium-efficiency particulate air filters, pressure loss becomes higher.

Porous polytetrafluoroethylene film is known as a low-pressure-loss filter medium, but porous polytetrafluoroethylene film generally has the problem that its film strength becomes lower because the low pressure loss is realized by making the film thickness thinner. In order to solve this problem, in Japanese Patent Examined Publication No. 2007-0547, the porous polytetrafluoroethylene film is manufactured under special conditions.

Incidentally, it is generally required that the filter media be difficult to clog, that is, that the filter media have a high dust holding capacity. In a case particularly where oil droplets or the like have flowed into conventional porous polytetrafluoroethylene film, the surface of the porous polytetrafluoroethylene film becomes covered with a liquid film and the life span of the porous polytetrafluoroethylene film drops remarkably. For this reason, porous polytetrafluoroethylene film is used mainly in combination with medium-efficiency particulate air filters to clean the air in clean rooms for the semiconductor industry. However, when porous polytetrafluoroethylene film is used in medium-efficiency particulate air filters in hospitals or the like, an even higher dust holding capacity is needed, and it is required that the filter media be difficult to clog particularly even if liquid droplets such as oil droplets or water droplets flow into the filter medium.

SUMMARY

Technical Problem

With respect to this, a filter medium equipped with a porous film having both a higher collection efficiency and lower pressure loss is demanded.

Further, the porous film obtained by the manufacturing method described in patent citation 1 does not achieve a high dust holding capacity.

That is, it is an object of the present invention to provide a filter medium equipped with a porous film whose collection efficiency is high, whose pressure loss is low, and whose dust holding capacity is high.

Solution to the Problem

The present invention provides sections 1 to 13 listed below.

[Section 1]

A filter medium comprising:

a porous film that comprises polytetrafluoroethylene, has an average pore diameter of 2.5 μm or more, and has a porosity of 95% or more; and a support material that supports the porous film, wherein pressure loss when air is passed through the filter medium at a velocity of 5.3 cm/sec is less than 100 Pa, the collection efficiency of NaCl particles when air including NaCl particles with a particle diameter of 0.3 μm is passed through the filter medium at a velocity of 5.3 cm/sec is 95% or more, the PF value calculated in accordance with the equation PF={−log [(100−collection efficiency (%))/100]/pressure loss (Pa)}×1000 from the pressure loss and the collection efficiency is 30 or more, and the dust holding capacity of polyalphaolefin particles held in the filter medium when air including polyalphaolefin particles with a count median diameter of 0.25 μm is continuously passed through the filter medium at a velocity of 5.3 cm/sec and pressure loss reaches 300 Pa is 15 g/m² or more.

[Section 2]

The filter medium according to section 1, wherein the porous film is a porous film mainly comprising modified polytetrafluoroethylene.

[Section 3]

The filter medium according to section 2, wherein the modified polytetrafluoroethylene is a copolymer of tetrafluoroethylene and perfluoroalkyl vinyl ether.

[Section 4]

A filter medium comprising:

a porous film; and a support material that supports the porous film, wherein the porous film is, in a case where an extrusion aid is mixed at 20.5 weight % together with polytetrafluoroethylene and allowed to mature for 1 hour at room temperature to obtain a mixture, obtained from the polytetrafluoroethylene whose paste extrusion pressure at an extrusion speed of 32,000 mm/min at a reduction ratio of 1,600 is equal to or more than 50 MPa and less than or equal to 110 MPa and whose molecular weight distribution expressed by weight average molecular weight/number average molecular weight is 4.0 or more, and the porous film mainly comprises modified polytetrafluoroethylene.

[Section 5]

The filter medium according to section 4, wherein the modified polytetrafluoroethylene is a copolymer of tetrafluoroethylene and perfluoroalkyl vinyl ether.

[Section 6]

The filter medium according to section 4 or 5, wherein the average pore diameter is 2.5 μm or more and the porosity is 95% or more.

[Section 7]

The filter medium according to any one of sections 4 to 6, wherein pressure loss when air is passed through the filter medium at a velocity of 5.3 cm/sec is less than 100 Pa, and the collection efficiency of NaCl particles when air including NaCl particles with a particle diameter of 0.3 μm is passed through the filter medium at a velocity of 5.3 cm/sec is 95% or more.

[Section 8]

The filter medium according to any one of sections 4 to 7, wherein the PF value calculated in accordance with the equation PF={−log [(100−collection efficiency (%))/100]/pressure loss (Pa)}×1000 from the pressure loss when air is passed through the filter medium at a velocity of 5.3 cm/sec and the collection efficiency of NaCl particles when air including NaCl particles with a particle diameter of 0.3 μm is passed through the filter medium at a velocity of 5.3 cm/sec is 30 or more.

[Section 9]

The filter medium according to any one of sections 4 to 8, wherein the dust holding capacity of polyalphaolefin particles held in the filter medium when air including polyalphaolefin particles with a count median diameter of 0.25 μm is continuously passed through the filter medium at a velocity of 5.3 cm/sec and pressure loss reaches 300 Pa is 15 g/m² or more.

[Section 10]

A method of manufacturing a filter medium comprising the steps of:

preparing an unsintered film mainly comprising modified polytetrafluoroethylene;

stretching the unsintered film at a ratio of 2 times to 50 times in a first direction and subsequently stretching the unsintered film at a ratio of 2 times to 80 times in a second direction perpendicular to the first direction to produce pores in the unsintered film and obtain a porous film; and placing a support material on at least one side of the obtained porous film in such a way as to support the porous film.

[Section 11]

The manufacturing method according to section 10, wherein the unsintered film is formed from a fine powder of modified polytetrafluoroethylene,

[Section 12]

A filter pack comprising the filter medium according to any one of sections 1 to 9 that has been shaped into a predetermined shape or the filter medium manufactured by the manufacturing method of section 10 or 11,

[Section 13]

A filter unit comprising:

the filter pack according to section 12; and a frame body in which the filter pack is stored.

Advantageous Effects of Invention

According to the present invention, there is obtained a porous film having a high collection efficiency and low pressure loss and having a high dust holding capacity.

DESCRIPTION OF EMBODIMENTS

Figure 1:
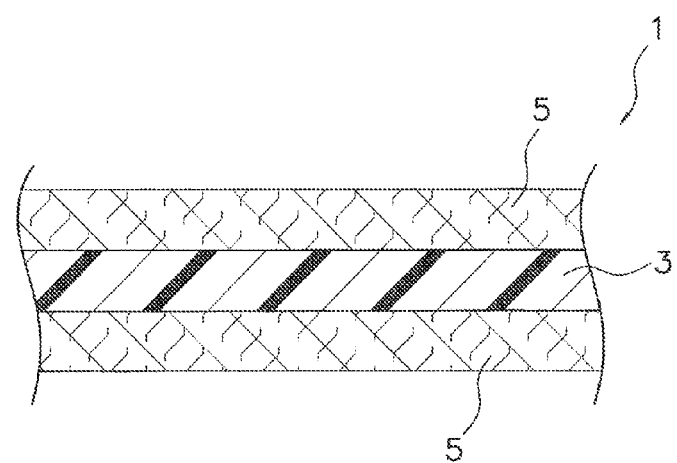
FIG. 1 is a longitudinal sectional view showing an embodiment of a filter medium of the present invention.

In the present specification, the word "to" indicating numerical ranges is used to mean that the numerical range in question includes the numerical values on both ends. That is, for example, "a to b" means "equal to or greater than a and equal to or less than b".

<Filter Medium>

A filter medium of the present invention is equipped with a porous film comprising polytetrafluoroethylene and a support material that supports the porous film.

The support material is placed on at least one side of the porous film in such a way as to support the porous film. That is, the support material is placed on one side or both sides of the porous film.

The numbers of the porous film and the support material are not limited; for example, the filter medium of the present invention may be one in which plural porous films and plural support materials are alternately layered on top of each other.

In the filter medium of the present invention, preferably, pressure loss when air is passed through the filter medium at a velocity of 5.3 cm/sec is less than 100 Pa, and the collection efficiency of NaCl particles when air including NaCl particles with a particle diameter of 0.3 μm is passed through the filter medium at a velocity of 5.3 cm/sec is preferably 95% or more. In the present invention, "collection efficiency" means the initial collection efficiency measured in a state in which no clogging is occurring.

Further, in the filter medium of the present invention, the PF value calculated in accordance with the equation PF={−log [(100−collection efficiency (%))/100]/pressure loss (Pa)}×1000 from the pressure loss and the collection efficiency is preferably 30 or more and more preferably 40 or more.

Further, in the filter medium of the present invention, the dust holding capacity is preferably 15 g/m² or more and more preferably 25 g/m² or more. The dust holding capacity is the weight, per unit area of the filter medium, of polyalphaolefin particles held in the filter medium when air including polyalphaolefin particles with a count median diameter of 0.25 μm is continuously passed through the filter medium at a velocity of 5.3 cm/sec and pressure loss reaches 300 Pa.

These filter medium performance aspects mainly derive from the performance of the porous film comprising polytetrafluoroethylene described below.

<Porous Film>

The porous film used in the present invention comprises polytetrafluoroethylene.

The polytetrafluoroethylene used in the present invention includes homogeneous polytetrafluoroethylene (narrowly defined polytetrafluoroethylene) and modified polytetrafluoroethylene.

In the present specification, sometimes "polytetrafluoroethylene", "homogeneous polytetrafluoroethylene", and "modified polytetrafluoroethylence" are abbreviated as PTFE, homogeneous PTFE, and modified PTFE, respectively.

The porous film used in the present invention preferably mainly comprises modified polytetrafluoroethylene from the standpoint of realizing low pressure loss and a high dust holding capacity.

The modified polytetrafluoroethylene is a copolymer of tetrafluoroethylene and a comonomer.

Examples of the comonomer include hexafluoropropylene, perfluoroalkyl vinyl ether, trifluorochloroethylene, and vinylidene fluoride.

Among these, perfluoroalkyl vinyl ether is preferred, and perfluoroalkyl vinyl ether in which the carbon number of the alkyl group is 1 to 5 (preferably, the number of carbon atoms is 1 to 3) is more preferred.

The comonomer may be one type or may be two or more types.

The content of the units derived from the comonomer in the modified polytetrafluoroethylene used in the present invention is preferably 0.001 to 0.30 weight % of the total modified polytetrafluoroethylene. In the present specification, sometimes this content is called the degree of modification. Modified PTFE fine powder whose degree of modification is this extent can well keep its non-melt processability because it is difficult to melt process, which is preferred.

The upper limit of the degree of modification is preferably 0.30 weight %.

The lower limit of the degree of modification is preferably 0.001 weight %.

The modified polytetrafluoroethylene used in the present invention may be one type or may be a mixture of two or more types in which the comonomers or the degrees of modification are different.

The polytetrafluoroethylene of the porous film used in the present invention contains modified polytetrafluoroethylene preferably at 90 weight % or more, more preferably at 95 weight % or more, and even more preferably at 98 weight % or more, and particularly preferably comprises 100 weight % of modified polytetrafluoroethylene.

The porous film used in the present invention may also contain homogeneous polytetrafluoroethylene to the extent that it does not cause the effects of the present invention to be lost. Specifically, the porous film used in the present invention contains homogeneous polytetrafluoroethylene preferably at less than 10 weight %, more preferably at less than 5 weight %, and even more preferably at less than 2 weight %, and particularly preferably does not contain homogeneous polytetrafluoroethylene.

The molecular weight distribution Mw/Mn of the polytetrafluoroethylene used in the present invention is preferably 4.0 or more and more preferably 4.5 or more. In order to make the extensional behavior better, the value of the molecular weight distribution Mw/Mn is preferably 4.0 or more. Further, the molecular weight distribution Mw/Mn is preferably 30 or less.

In a case where an extrusion aid (hydrocarbon oil (trade name Isopar G (registered trademark), ExxonMobil Chemical Company)) is mixed at 20.5 weight % together with the polytetrafluoroethylene used in the present invention and allowed to mature for 1 hour at room temperature (25±2° C.) to obtain a mixture, the paste extrusion pressure at an extrusion speed of 32,000 mm/min at a reduction ratio of 1,600 is preferably 50 MPa or more but is not limited to this. The paste extrusion pressure is more preferably 70 MPa or more. The paste extrusion pressure is preferably 110 MN or less. In order to obtain a porous film whose extensional behavior is good, the paste extrusion pressure is preferably 50 MPa or more.

Further, in order to perform paste extrusion at a reduction ratio of 1,600 (RR 1,600), the paste extrusion pressure is preferably 110 MN or less.

The porous film used in the present invention (preferably has an average pore diameter 2.5 μm or more and a porosity of 95% or more. Because of this large average pore diameter and high porosity, the porous film used in the present invention realizes a filter medium having a high collection efficiency and low pressure loss and having a high dust holding capacity.

In the present specification, the average pore diameter is the mean flow pore size (MFP) measured according to ASTM F-316-86. The average pore diameter can be measured using a Coulter Porometer made by Coulter Electronics (England).

In the present specification, porosity is a numerical value found by the following equation.

Porosity (%)={1−[weight (g) of film/(area (cm$^2$) of main surface of film×film thickness (cm)×density (g/cm$^3$) of PTFE)]}×100

Specifically, the porosity can be found by cutting out the porous PTFE film, whose film thickness has been measured, into 20×20 cm and measuring the weight.

The thickness of the porous film used in the present invention is preferably 5 to 10 μl.

In the filter medium of the present invention, the porous film may be used as a single film or may be used by stacking plural layers. In this case, the plural layers of porous films maybe the same type or may be different types. Further, the porous film may be used in combination with a porous film other than the above-described porous film provided that it achieves the effects of the present invention.

<Support Material>

The support material supports the porous film and is preferably adhered to the porous film.

The support material is not particularly limited as long as it is permeable to air and can support the porous film, but non-woven fabric is preferred.

Examples of the non-woven fabric include polyethylene terephthalate (PET) fiber non-woven fabric, polybutylene terephthalate (pan fiber non-woven fabric, non-woven fabric with a core-sheath structure where the core component is PET and the sheath component is polyethylene (PE) (PET/PE core/sheath non-woven fabric), non-woven fabric with a core-sheath structure where the core component is PET and the sheath component is PBT (PET/PBT core/sheath non-woven fabric), non-woven fabric with a core-sheath structure where the core component is high-melting-point PET and the sheath component is low-melting-point PET (high-melting-point PET/low-melting-point PET core/sheath non-woven fabric), non-woven fabric comprising composite fiber of PET fiber and PBT fiber, and non-woven fabric comprising composite fiber of high-melting-point PET fiber and low-melting-point PET fiber.

It is preferred that the support material be highly permeable to air and have low pressure loss so as to not hinder the effects of the present invention.

As mentioned above, the performance of the filter medium of the present invention mainly derives from the performance of the porous film comprising polytetrafluoroethylene, and a sufficiently high dust holding capacity is obtained even without using a support material having a pre-filter function, but a melt-blown non-woven fabric or the like may also be used as the support material with the purpose of further increasing the dust holding capacity.

The pore diameter of the support material is preferably larger than the pore diameter of the porous polytetrafluoroethylene film.

The basis weight of the non-woven fabric used for the support material is ordinarily 10 to 600 g/m², preferably 15 to 300 g/m², and more preferably 15 to 100 g/m². Further, the film thickness of the non-woven fabric used for the support material is preferably 0.10 to 0.52 mm.

Method of Manufacturing Filter Medium>

The filter medium of the present invention can be manufactured, for example, by a manufacturing method including: step 1 of preparing an unsintered film comprising polytetrafluoroethylene; step 2 of stretching the unsintered film in a first direction and subsequently stretching the unsintered film in a second direction perpendicular to the first direction to produce pores in the unsintered film; and step 3 of placing a support material on at least one side of the obtained porous film so as to support the porous film.

A case where the polytetrafluoroethylene mainly comprises modified polytetrafluoroethylene will be described below, but even in cases other than this, the filter medium of the present invention can be manufactured according to this description.

The unsintered film mainly comprising modified polytetrafluoroethylene is formed from modified polytetrafluoroethylene fine particles.

Among them, preferably the unsintered film mainly comprising modified polytetrafluoroethylene is formed from polytetrafluoroethylene fine powder.

The polytetrafluoroethylene fine powder is secondary particles in which polytetrafluoroethylene fine particles (primary particles) have aggregated.

In addition to an unsintered film, a semi-sintered film can also be used.

a) Step 1

The unsintered film mainly comprising modified polytetrafluoroethylene (sometimes simply called "unsintered film" below) can be manufactured, for example, by a manufacturing method including: step 1-1 of mixing together modified PTFE fine particles, and homogeneous PTFE fine particles that are combined as desired, and an extrusion aid (liquid lubricant); step 1-2 of shaping the obtained mixture into a film shape; and step 1-3 of removing the extrusion aid (liquid lubricant) from the obtained film-shaped molded product as desired.

(1) Step 1-1

The modified PTFE in the modified PTFE fine particles is preferably a copolymer. "Copolymer" in this case means a polymer in which tetrafluoroethylene and a modifier have been uniformly mixed together and polymerized in the meaning used in the polymerization of ordinary copolymers. That is, as for the PTFE fine particles suitably used in this manufacturing method, for example, modified PTFE fine particles having a non-uniform structure including a homogeneous PTFE core and a modified PTFE shell in the primary particles are not preferred, but PTFE fine particles where the degree of modification of the shell portion is low can be used.

In this step, the modified PTFE fine particles and the homogeneous PTFE particles may have the form of a mixture of modified polytetrafluoroethylene fine powder and homogeneous polytetrafluoroethylene fine powder or may have the form of a powder composition obtained by the co-coagulation and subsequent drying of a modified polytetrafluoroethylene aqueous dispersion and a homogeneous polytetrafluoroethylene aqueous dispersion.

The average (primary particle diameter of the PTFE fine particles is preferably 0.1 to 1 μm.

The average secondary particle diameter of the PTFE fine particles is preferably 300 to 700 μm.

The larger the amount of the homogenous PTFE fine powder in the mixture is, the easier the stretching described later becomes. However, the larger the amount of the homogeneous PTFE fine powder is, the higher the pressure loss of the eventually obtained porous film becomes and the lower the dust holding capacity becomes. The added amount of the homogeneous PTFE fine powder is preferably less than 10 weight %, more preferably less than 5 weight %, even more preferably less than 2 weight %, and particularly preferably 0 weight % with respect to all the PTFE fine powder. The added amount corresponds to the content of the homogeneous PTFE in the obtained porous film.

The extrusion aid (liquid lubricant) is not particularly limited provided that it is a substance that can wet the surface of the PTFE fine powder and can be removed after the mixture has been shaped into the film shape; examples include alcohols, ketones, and esters of hydrocarbon oils such as liquid paraffin, naphtha, white oil, toluene, and xylene.

The use amount of the liquid lubricant differs depending on the type of liquid lubricant and so forth, but ordinarily it is 5 to 50 parts by weight with respect to 100 parts by weight of the PTFE fine powder. By increasing the use amount of the liquid lubricant, pressure loss can be reduced.

(2) Step 1-2

It suffices for the shaping of the mixture into the film shape to be performed by common methods such as extrusion and rolling, for example.

Preferably, the mixture is paste extruded, and the obtained rod-shaped product is rolled using a calendar roll or the like.

It suffices for the thickness of the obtained film-shaped product to be set on the basis of the thickness of the intended porous film, but ordinarily it is 100 to 300 μm.

(3) Step 1-3

It suffices for the extrusion aid removal to be implemented by heating the unsintered film on which the extrusion aid remains to thereby cause the extrusion aid to evaporate.

The unsintered film may also be acquired as a commercial product.

b) Step 2

Pores are produced in the unsintered film by stretching the unsintered film in a first direction and subsequently stretching the unsintered film in a second direction perpendicular to the first direction.

(1) Stretching in First Direction

The first direction is preferably the lengthwise direction of the unsintered film.

The draw ratio of the stretching in the first direction is preferably 2 to 50 times, more preferably 3 to 30 times, and even more preferably 5 to 20 times.

The speed of the stretching in the first direction is preferably 300 to 600%/sec.

The temperature at the time of the stretching in the first direction is preferably 200 to 350° C. and more preferably 220 to 270° C.

(2) Stretching in Second Direction

The second direction is preferably the width direction of the unsintered film.

The draw ratio of the stretching in the second direction is preferably 2 to 80 times, more preferably 5 to 50 times, and even more preferably 10 to 45 times.

The speed of the stretching in the second direction is (preferably 300 to 600%/sec.

The temperature at the time of the stretching in the second direction is preferably 200 to 350° C. and more preferably 220 to 270° C.

The porous film obtained by step 2 is preferably heat fixed.

The temperature of the heat fixing may be equal to or higher than, or equal to or lower than, the melting point of PTFE. Preferably, the temperature is 250 to 350° C.

c) Step 3

In step 3, the filter medium of the present invention is obtained by layering the porous film and the support material in such a way that the support material supports the porous film. It suffices for a publicly known method to be used for the layering method. For example, in a case where the support material comprises heat fusible non-woven fabric, the filter medium of the present invention can be manufactured by thermal lamination. Further, for example, the porous film and the support material may also be adhered to each other using polyester or tetrafluoroethylene/perfluoroalkyl vinyl ether copolymer (PFA) powder or a hot melt adhesive.

FIG. 1 shows an embodiment of the filter medium of the present invention.

A filter medium 1 is equipped with a porous film 3 comprising PTFE and an air-permeable support material 5 that is thermally laminated on both sides of the porous PTFE <Filter Pack>

A filter pack of the present invention is equipped with the filter medium of the present invention that has been shaped into a predetermined shape. Examples of the predetermined shape include a corrugated shape. The corrugated shape can be held preferably by a separator or a spacer.

The shape of the separator is ordinarily a corrugated sheet shape. The material of the separator is not particularly limited, and examples thereof include aluminum.

The material of the spacer is not particularly limited, and examples thereof include a hot melt resin adhesive such as polyamide.

The filter pack of the present invention may be equipped with the filter medium of the present invention that has been pleated and a spacer for maintaining the shape of the filter medium.

It suffices for the pleating of the filter medium to be implemented using a reciprocating folder, for example.

Figure 2:
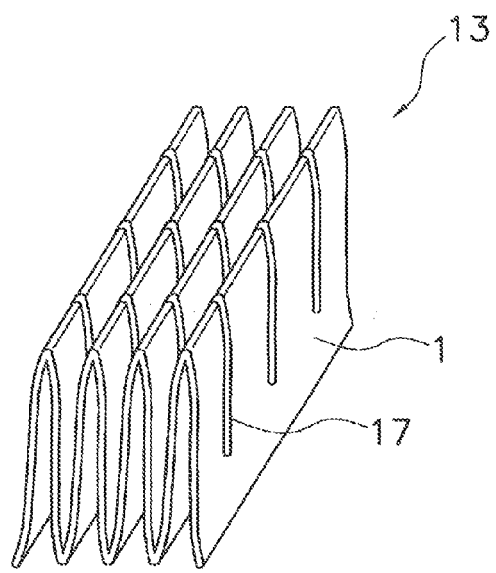
FIG. 2 is a perspective view showing an embodiment of a filter pack of the present invention.

FIG. 2 shows an embodiment of the filter pack of the present invention.

As shown in FIG. 2, a filter pack 13 is configured from the filter medium 1 and a spacer 17.

The filter medium 1 is alternately folded back and forth and processed (pleated) into a corrugated shape.

The aforementioned filter medium is used for the filter medium 1, and the filter medium 1 is alternately folded back and forth and processed (pleated) into a corrugated shape.

The spacer 17 is for holding the corrugated shape of the pleated filter medium 1 and comprises a hot melt resin adhesive such as polyamide.

<Filter Unit>

A filter unit of the present invention is equipped with the filter pack of the present invention and a frame body in which the filter pack is stored.

Examples of the filter unit of the present invention include a mini-pleat air filter unit using a spacer and a separator air filter unit using a separator.

The filter unit of the present invention can be suitably used as a medium-efficiency particulate air filter unit and is preferably a separator air filter unit.

The frame body is not particularly limited as long as it can store and hold the filter pack; for example, the frame body is obtained by assembling four aluminum frames.

Figure 3:
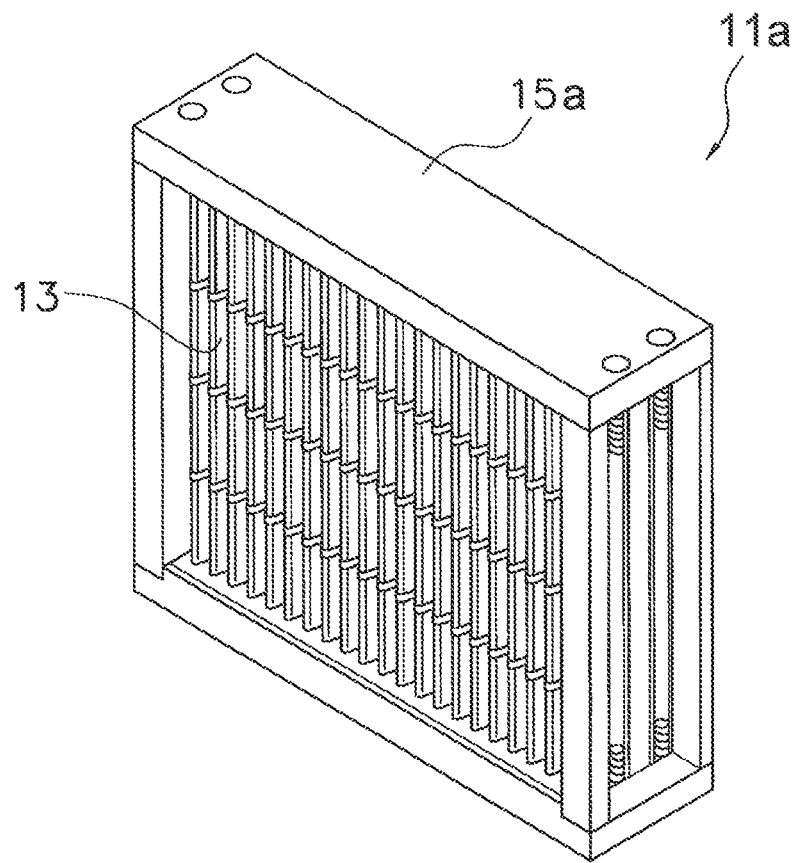
FIG. 3 is a perspective view showing an embodiment of an air filter unit of the present invention.

FIG. 3 shows a mini-pleat air filter unit 11a in which an embodiment of the present invention is employed.

The mini-pleat air filter unit 11a is equipped with the filter pack 13 and a frame body 15a in which the filter pack 13 is stored.

Figure 4:
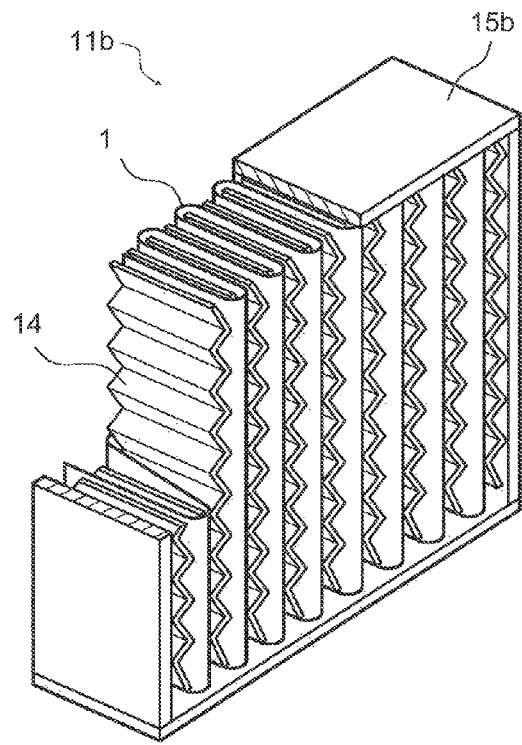
FIG. 4 is a partial cutaway perspective view showing another embodiment of the air filter unit of the present invention.

FIG. 4 shows a separator air filter unit 11b in which another embodiment of the present invention is employed.

In the separator air filter unit 11b, the filter medium 1 is bent in a corrugated shape via a corrugated sheet-shaped separator 14 and is stored inside a frame body 15b.

Working Examples

Working Example 1

A preform was obtained by adding 26 parts by weight of an extrusion aid (IP Solvent 2028 made by Idemitsu Kosan Co., Ltd.) to, and mixing the extrusion aid with, 100 parts per weight of modified PTFE fine powder 1 (perfluoropropylvinyl ether copolymer modification, modification amount of 0.10 weight %, molecular weight distribution Mw/Mn of 6.8, paste extrusion pressure of 88 MPa at a reduction ratio of 1,600 (RR 1,600)), which was manufactured in accordance with the method described in Japanese Patent Examined Publication No. 64-1711 by preparing tetrafluoroethylene, subsequently preparing perfluoroalkyl vinyl ether (the carbon number of the alkyl group is 3; $CF_2$=CF—O—$C_3F_7$), and then allowing a reaction with an initiator. Next, the preform was shaped into a cylinder shape by paste extrusion. Then, the cylinder-shaped compact was shaped into a film shape by a calendar roll heated to 70° C. to obtain a PTFE film. The film was passed through a hot-air drying oven at 200° C. to evaporate and remove the extrusion aid, thereby obtaining an unsintered film having an average thickness of 200 μm and an average width of 150 mm.

Figure 5:
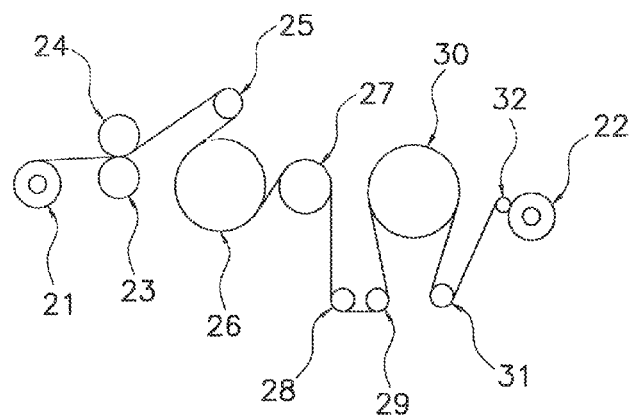
FIG. 5 is a schematic diagram showing an apparatus used to stretch a polytetrafluoroethylene film in its lengthwise direction.

The unsintered film was stretched at a draw ratio of 10 times in its lengthwise direction using the device shown in FIG. 5. The unsintered film was set on a roll 21, and the stretched film was taken up onto a take-up roll 22. Further, stretching was performed at a draw temperature of 250° C. In FIG. 5, 23 to 25 are rolls, 26 and 27 are heat rolls, and 28 to 32 are rolls.

Figure 6:
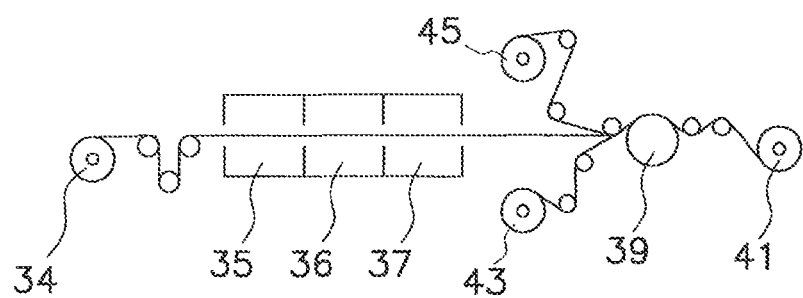
FIG. 6 is a schematic diagram showing an apparatus (left half) used to stretch the polytetrafluoroethylene film in its width direction and an apparatus (right half) that laminates a non-woven fabric on the polytetrafluoroethylene film.

Next, the obtained film that was stretched in its lengthwise direction was stretched at a draw ratio of 36 times in its width direction using the device (a tenter) shown in the left half of FIG. 6, which can continuously sandwich the film with clips, and then heat fixing was performed, whereby a porous PTFE film was obtained. The draw temperature at this time was 220° C., the heat fixing temperature was 300° C., and the draw speed was 500%/sec. A filter medium was obtained by using non-woven fabrics A and B described below and heat fusing them to both sides of the porous PTFE film with the device shown in the right half of FIG. 6.

Non-woven fabric A: "Eleves S0403WDO" PET/PE core/sheath non-woven fabric made by Unitika Ltd., basis weight of 40 g/m$^2$ Non-woven fabric "Eleves T0403WDO" PET/PE core/sheath non-woven fabric made by Unitika Ltd., basis weight of 40 g/m$^2$ In FIG. 6, 34 is a feed roll 34 for feeding the film that has been stretched in its lengthwise direction, 35 is a pre-heating zone, 36 is a stretching zone, 37 is a heat fixing zone, 39 is a lamination roll, 41 is a take-up roll, 43 is a feed roll fbr feeding a first support material, and 45 is a feed roll for feeding a second support material.

wFurther, the heat fusion conditions at this time were as follows.

(Heat Fusion Conditions)
Heating temperature: 200° C.
Line speed: 15 in/min

Working Example 2

Working example 2 was implemented in order to investigate the effect of the ratio of the modification amount.

The same operations as in working example 1 were performed, other than using modified PTFE fine powder 2 "(perfluoropropylvinyl ether copolymer modification, modification amount of 0.15 weight (36, molecular weight distribution Mw/N/In of 5.0, paste extrusion pressure of 83 MPa at a reduction ratio of 1,600 (RR 1,600)), which was manufactured in accordance with the method described in Japanese Patent Examined Publication No. 50-38159 by preparing tetrafluoroethylene, subsequently preparing perfluoroalkyl vinyl ether (the carbon number of the alkyl group is 3; $CF_2=CF-O-C_3F_7$), and allowing a reaction with an initiator.

Working Example 3

Working example 3 was implemented in order to investigate the effect of adding homogeneous PTFE fine powder.

The same operations as in working example 1 were performed, other than using a mixture obtained by mixing 5 weight % of homogeneous PTFE fine powder 5 ("Polyflon Fine Powder F-106" made by Daikin Industries, Ltd.) together with 95 weight % of modified PTFE fine powder 2 manufactured in accordance with the method described in Japanese Patent Examined Publication No. 50-38159.

Stretching became easier as a result of adding a small amount ohomogeneous PTFE fine powder.

Working Example 4

Working example 4 was implemented in order to investigate the effect of the use amount of the liquid lubricant. The same operations as in working example 2 were performed, other than changing the amount of the extrusion aid to 24 parts by weight.

Comparative Example 1

Comparative example 1 was implemented in order to investigate the effect of the molecular weight distribution Mw/Mn of the modified PTFE fine powder. Instead of modified PTFE fine powder 1, the same operations as in working example 1 were performed, other than using modified PTFE fine powder 3 (polytetrafluoroethylene ether copolymer modification, modification amount of 0.12 weight %, molecular weight distribution Mw/Mn of 3.9, paste extrusion pressure of 78 MPa at a reduction ratio of 1,600 (RR 1,600)), which was manufactured in accordance with the method described in Japanese Patent Examined Publication No. 10-53624 by preparing tetrafluoroethylene, subsequently preparing perfluoroalkyl vinyl ether (the carbon number of the alkyl group is 3; $CF_2=CF-O-C_3F_7$), and allowing a reaction with an initiator. However, the obtained unsintered film could not be stretched in its lengthwise direction and a porous film could not be obtained. The reason for this is thought to be because the extensional behavior ended up deteriorating and stretching became difficult because the molecular weight distribution Mw/Mn was small.

Comparative Example 2

Instead of modified PTFE fine powder 1, modified PTFE fine powder 4 having a core-shell structure in which the core portion comprises PTFE and the shell portion comprises a copolymer of tetrafluoroethylene (TFE) and perfluoropropylvinyl ether was manufactured in accordance with the method described in WO 2006/054612. The same operations as in working example 1 were performed, other than using modified PTFE fine powder 4 (modification amount of 0.03 weight %, paste extrusion pressure of 34 MPa at a reduction ratio of 1,600 (RR 1,600)). However, the obtained unsintered film could not be stretched in its lengthwise direction and a porous film could not be obtained. The reason for this is thought to be because the linkage of the primary particles was difficult and stretching became difficult because the modification amount of the shell portions on the outsides of the primary particles of PTFE was large.

Comparative Example 3

A preform was obtained by adding 30 parts by weight of an extrusion aid to, and mixing the extrusion aid with, 100 parts by weight of homogeneous PTFE fine powder 5 ("Polyflon Fine Powder F-106" made by Daikin Industries, Ltd.; the paste extrusion pressure at a reduction ratio of 1,600 (RR 1,600) was impossible to measure). Next, the preform was shaped into a cylinder shape by paste extrusion. Then, the cylinder-shaped compact was shaped into a film shape by a calendar roll heated to 70° C. to obtain a PTFE film. The film was passed through a hot-air drying oven at 200° C. to evaporate and remove the extrusion aid, thereby obtaining an unsintered film having an average thickness of 200 μm and an average width of 150 mm.

The unsintered film was stretched at a draw ratio of 48 times in its lengthwise direction using the device shown in FIG. 5. The unsintered film was set on the roll 21, and the stretched film was taken up onto the take-up roll 22. Further, stretching was performed at a draw temperature of 250° C.

Next, the obtained film that was stretched in its lengthwise direction was stretched at a draw ratio of 36 times in its width direction using the device (a tenter) shown in the left half of FIG. 6, which can continuously sandwich the film with clips, and then heat fixing was performed, whereby a porous PTFE film was obtained. The draw temperature at this time was 290° C., the heat fixing temperature was 345° C., and the draw speed was 500%/sec. A filter medium was obtained by using non-woven fabrics A and B described below and heat fusing them to both sides of the porous PTFE film with the device shown in the right half of FIG. 6.

In comparative example 3, in order to make a comparison with working examples 1 to 3, it was ensured that the pressure loss became a pressure loss close to these. This was realized by increasing the amount of the extrusion aid, increasing the draw ratio in the lengthwise direction, and raising the draw temperature in the width direction.

Non-woven fabric A: "Eleves S0403WDO" PET/PE core/sheath non-woven fabric made by Unitika Ltd., basis weight of 40 g/m²

Non-woven fabric B: "Eleves T0403WDO" PET/PE core/sheath non-woven fabric made by Unitika Ltd., basis weight of 40 g/m²

Further, the heat fusion conditions at this time were as follows.
(Heat Fusion Conditions)
Heating temperature: 200° C.
Line speed: 15 m/min Reference Example 1

The medium-efficiency glass filter 2991 made by Lydall, Inc. was used as reference example 1.

Table 1 below shows the physical properties of the porous films of working examples 1 to 4 and comparative examples 1 to 3 and the physical properties of the filter media obtained by heat sealing non-woven fabric to these. Further, table 1 shows the physical properties of the medium-efficiency glass filter of reference example 1.

Methods of measuring the physical properties are described below.
Pressure Loss (Pa)

Measurement samples of the porous PTFE films and the filter media were set in a filter holder having a diameter of 100 mm, the inlet side was pressurized with a compressor, and the flow rate at which air passed through was adjusted to 5.3 cm/sec with a flowmeter. Then, pressure loss at this time was measured with a manometer.

<Collection Efficiency (NaCl 0.3 μm Particles)>

NaCl particles generated by an atomizer were classified to 0.3 μm by an electrostatic classifier (made by TSI Inc.), americium 241 was used to neutralize the particle charges, thereafter the flow rate at which particles passed through was adjusted to 5.3 cm/sec, a particle counter (CNC made by TSI Inc.) was used to find the number of particles before and after the evaluation filters, and the collection efficiency was calculated by the following equation.

Collection Efficiency (%)=(CO/CI)×100

CO=Number of particles of NaCl 0.3 μm collected by evaluation samples
CI=Number of particles of NaCl 0.3 μm supplied to evaluation samples <Collection Efficiency (NaCl 0.1 μm Particles)>

NaCl particles generated by an atomizer were classified to 0.1 μm by an electrostatic classifier (made by TSI Inc.), americium 241 was used to neutralize the particle charges, thereafter the flow rate at which particles passed through was adjusted to 5.3 cm/sec, a particle counter (CNC made by TSI Inc.) was used to find the number of particles before and after the evaluation filters, and the collection efficiency was calculated by the following equation.

Collection Efficiency (%)=(CO/CI)×100

CO=Number of particles of NaCl 0.1 μm collected by evaluation samples
CI=Number of particles of NaCl 0.1 μm supplied to evaluation samples <PF Value (NaCl 0.3 μm)>

The PF values of the filter media (NaCl 0.3 μm) were found by substituting the pressure loss and the collection efficiency of the filter media (NaCl 0.3 μm) into the following equation.

PF value (NaCl 0.3 μm)={−log [(100−collection efficiency (%))/100]/pressure loss (Pa)}×1000

<PF Value (NaCl 0.1 μm)>

The PF values of the filter media (NaCl 0.1 μm) were found by substituting the pressure loss and the collection efficiency of the filter media (NaCl 0.1 μm) into the following equation.

PF value (NaCl 0.1 μm)={−log [(100−collection efficiency (%))/100]/pressure loss (Pa)}×1000

<Average Pore Diameter>

As for the pore diameter of the modified porous PTFE films, the mean flow pore size (MIT) measured according to ASTM F-316-86 was used for the average pore diameter of the modified porous PTFE films. The actual measurement was performed with a Coulter Porometer made by Coulter Electronics (England).

<Film Thickness of Porous PTFE Films>

A film thickness meter (1D-110 MH made by Mitutoyo Corporation) was used, 5 layers of the porous PTFE films were stacked on top of each other, the film thickness of the entire stack was measured, and the numerical value Obtained by dividing that value by 5 was used as the film thickness of one layer.

<Porosity of Porous PTFE Films>

The porous PTFE films whose film thickness was measured were cut out to 20×20 cm, their weights were measured, and their porosities were found by the following equation.

Porosity (%)={1−[weight (g)/(400×film thickness (cm)×2.2 (density of PTFE)]}×100

<Dust Holding Capacity of Polyalphaolefin (PAO) (Liquid Particles)>

The "dust holding capacity of PAO (liquid particles)" was measured by a pressure drop build-up test at the time of passage of PAO particles. That is, pressure loss when air including PAO particles was continuously passed at a velocity of 5.3 cm/sec through a sample filter medium with an effective filtration area of 50 cm$^2$ was measured over time with a differential pressure gauge (U-tube manometer), and when pressure loss reached 300 Pa, the dust holding capacity (g/m$^2$)—which is the weight, per unit area of the filter medium, of the PAO particles held in the filter medium—was used for the "dust holding capacity of PAO (liquid particles)".

As for the PAO particles, PAO particles (with a count median diameter of 0.25 μm) generated with a Laskin nozzle were used, and the concentration of the PAO particles was about 1,000,000 to 6,000,000/cm$^3$.

<Dust Holding Capacity of NaCl (Solid Particles)>

The dust holding capacity of NaCl (solid particles) was evaluated by a pressure drop build-up test at the time of passage of NaCl particles. That is, pressure loss when air including Nan particles was continuously passed at a velocity of 5.3 cm/sec through a sample filter medium with an effective filtration area of 50 cm$^2$ was measured over time with a differential pressure gauge (U-tube manometer), and when pressure loss reached 450 Pa, the dust holding capacity (g/m$^2$)—which is the weight, per unit area of the filter medium, of the NaCl particles held in the filter medium—was used for the "dust holding capacity NaCl (solid particles)". The concentration of the NaCl particles was about 1,000,000 to 3,000,000/cm$^3$ (count median diameter of 0.05 μm).

<Paste Extrusion Pressure at Reduction Ratio 1,600 (RR 1,600)>

This was measured according to ASTM D 4895.

50 g of PTFE fine powder (regarding each of the aforementioned fine powders 1 to 5) and 10.25 g of hydrocarbon oil (trade name Isopar G (registered trademark), ExxonMobil Chemical Company), which is an extrusion aid, were mixed together for 3 minutes in a glass bottle and allow to mature for 1 hour at room temperature (25±2° C.). Next, an extrusion die (with a draw angle of 30° and having an orifice (with an orifice diameter of 0.65 ram and an orifice length of 2 mm)) having a cylinder (with an inner diameter of 25.4 mm) was filled with the mixture and a load of 1.2 MPa was applied to a piston inserted in the cylinder and held for 1 minute. Thereafter, immediately at room temperature, the mixture was extruded from the orifice at a ram speed of 20 mm/min to obtain a rod-shaped product. A value obtained by dividing, by the cross-sectional area of the cylinder, the pressure in the section where the pressure reaches a state of equilibrium during the latter half of extrusion was used for the paste extrusion pressure.

The extrusion speed was taken to be a value obtained by multiplying the ram speed by the reduction ratio; here, it was a value (32,000 min/min) obtained by multiplying the ram speed of 20 min/min by the reduction ratio of 1,600. Further, the extrusion speed is a value measured under a room temperature (25±2° C.) situation. Further, the extrusion speed represents a value in a state in which the extrusion aid (hydrocarbon oil (trade name Isopar G) has been added. This extrusion aid was liquid isoparaffin, its initial boiling point was 167° C., its dry point was 176° C., its density was 0.748 g/ml, and its kinematic viscosity was 1.49 mm²/sec.

<Molecular Weight Distribution Mw/Mn>

The molecular weight distribution Mw/Mn was measured in accordance with the method described in Japanese Patent Examined Publication No. 10-53624. Here, Mw represents weight average molecular weight and Mn represents number average molecular weight.

Dynamic viscoelasticity was measured at 380° C. using the viscoelasticity analyzer RDS-2 made by Rheometrics as the molecular weight distribution Mw/Mn analyzer. The frequency range was 0.001 to 500 rad/sec, and the sampling frequency of the measurement values was 5 points per single digit in logspace. The measurement values were data processed in accordance with S. Wu's method (*Polymer Engineering & Science,* 1988, Vol, 28, 538, *Polymer Engineering & Science,* 1989, Vol. 29, 273) to find Mn, Mw, and Mw/Mn.

At that time, time $t=1/\omega$ and $G(t)=G'(\omega)$ ($\omega$=frequency; $G(t)$=relaxation modulus; $G'(\omega)$=storage modulus). Further, measurement was repeatedly performed until the average of the deviation of $G'(\omega)$ in each measurement frequency became 5% or less in two consecutive measurements.

<Modifier Content>

The modifier content was measured in accordance with the method described in Japanese Patent Examined Publication No, 10-53624.

As the content of the fluoroalkyl vinyl ether in the modifier content polymer, a value (weight %) obtained by multiplying 0.14 by the ratio between the absorption of 995 $cm^{-1}$ of the infrared absorption band and the absorption of 935 $cm^{-1}$ of the infrared absorption band was used.

TABLE 1

| TABLE 1 | Material | Modification Method | Modification Amount | Mw/Mn | RR 1,600 | Pressure Loss | Collection Efficiency NaCl 0.1 μm | PF Value NaCl 0.1 μm | Collection Efficiency NaCl 0.3 μm | PF Value NaCl 0.3 μm | Dust Holding Capacity PAO 300 Pa | Dust Holding Capacity NaCl 450 Pa | Thickness | Average Pore Diameter | Porosity |
|---|---|---|---|---|---|---|---|---|---|---|---|---|---|---|---|
| | | | | | | | | | | | | | | Porous Film | |
| | | | | | | | | | | | | | | | |
| Working Example 1 | Modified PTFE | Copolymerization | 0.10 weight % | 6.8 | 88 | 68 Pa | 96.50% | 28.5 | 99.70% | 50.4 | 16 g/m² | 2.8 g/m² | 9.0 μm | 3.6 μm | 98.50% |
| Working Example 2 | Modified PTFE | Copolymerization | 0.15 weight % | 5.0 | 83 | 30 Pa | 86.11% | 28.6 | 96.09% | 46.9 | 72 g/m² | 3.5 g/m² | 6.2 μm | 6.5 μm | 98.10% |
| Working Example 3 | Modified PTFE + Homogenous PTFE | Copolymerization | 0.15 weight % | | | 37 Pa | 82.22% | 20.3 | 96.95% | 41.0 | 38 g/m² | 3.6 g/m² | 7.6 μm | 5.3 μm | 98.10% |
| Working Example 4 | Modified PTFE | Copolymerization | 0.15 weight % | 5.0 | | 50 Pa | 97.27% | 31.3 | 99.78% | 53.4 | 15 g/m² | 2.6 g/m² | 4.0 μm | 2.5 μm | 97.00% |
| Comparative Example 1 | Modified PTFE | Copolymerization | 0.12 weight % | 3.9 | 78 | Sample not obtained. | | | | | | | | | |
| Comparative Example 2 | Modified PTFE | Core-shell | 0.03 weight % | | 34 | Sample not obtained. | | | | | | | | | |
| Comparative Example 3 | Homogenous PTFE | — | — | | Measurement impossible | 50 Pa | 95.00% | 26.0 | 99.53% | 46.6 | 2.7 g/m² | 3.7 g/m² | 0.2 μm | 1.0 μm | 85.90% |
| Reference Example 1 | Glass Fiber Lydall 2991 | — | — | | | 112 Pa | 92.06% | 9.3 | 96.90% | 12.8 | 20 g/m² | 3.0 g/m² | 470 μm | — | 96.00% |

As is apparent from table 1, the filter media manufactured in working examples 1 to 4 had a high collection efficiency, low pressure loss, and a high dust holding capacity.

Comparing working example 3 and working example 2, it will be understood that by adding a small amount of homogeneous PTFE fine powder, stretchability improves as described above, but eventually the pressure loss of the obtained filter medium becomes a little larger and the dust holding capacity becomes a little lower.

Comparing working example 4 and working example 2, it will be understood that by decreasing the use amount of the liquid lubricant, the pressure loss becomes larger but the collection efficiency becomes higher.

As mentioned in comparative example 1 above, in the case of using modified PTFE fine powder in which the molecular weight distribution Mw/Mn is small, a porous film could not be obtained.

As mentioned in comparative example 2, in the case of using modified PTFE fine powder having a core-shell structure in which the modification amount of the shell portion is large, a porous film could not be obtained.

Comparing working examples 1 to 4 with comparative example 3, which uses homogeneous MT, fine powder, it will be understood that the filter media of working examples 1 to 4 had remarkably high dust holding capacities (PAO) in a case where the pressure losses are the same.

Comparing working examples 1 to 4 with reference example 1, which uses glass fiber, it will be understood that the filter media of working examples 1 to 4 had remarkably large PF values and had remarkably low pressure losses in a case where the collection efficiencies were the same, and the dust holding capacities were the same as or greater than that of reference example 1.

INDUSTRIAL APPLICABILITY

The filter medium of the present invention can be preferably used in, for example, (a) home appliances such as air conditioners, ventilation fans, and vacuum cleaners, (b) air conditioning installations in office buildings, hospitals, pharmaceutical factories, and food factories, and (c) industrial machinery or equipment such as semiconductor industry equipment, clean rooms, and turbines.

What is claimed is:

1. A filter medium comprising:
    a porous film including polytetrafluoroethylene, having an average pore diameter of at least 2.5 μm, and having a porosity of at least 95%; and
    a support material supporting the porous film,
    a pressure loss being less than 100 Pa when air is passed through the filter medium at a velocity of 5.3 cm/sec,
    a collection efficiency of NaCl particles being at least 95% when air including NaCl particles with a particle diameter of 0.3 μm is passed through the filter medium at a velocity of 5.3 cm/sec,
    a PF value being at least 30, where PF={−log [(100−collection efficiency (%))/100]/pressure loss (Pa)}×1000, and
    a dust holding capacity of polyalphaolefin particles held in the filter medium being at least 15 g/m² when air including polyalphaolefin particles with a count median diameter of 0.25 μm is continuously passed through the filter medium at a velocity of 5.3 cm/sec and pressure loss reaches 300 Pa.

2. The filter medium according to claim 1, wherein the porous film mainly includes modified polytetrafluoroethylene.

3. The filter medium according to claim 2, wherein the modified polytetrafluoroethylene is a copolymer of tetrafluoroethylene and perfluoroalkyl vinyl ether.

4. A filter pack including the filter medium according to claim 1, the filter medium being shaped into a predetermined shape.

5. A filter unit including e filter pack according to claim 4, the filter unit further comprising
    a frame body in which the filter pack is stored.

* * * * *